United States Patent
Eitel

(10) Patent No.: US 8,649,464 B2
(45) Date of Patent: Feb. 11, 2014

(54) QUADRATURE RECEIVER AND METHOD OF COMPENSATING FOR I/Q IMBALANCE USING A CALIBRATION SIGNAL

(75) Inventor: Ben Eitel, Gaertringen (DE)

(73) Assignee: SONY Corporation, Tokyo (JP)

( * ) Notice: Subject to any disclaimer, the term of this patent is extended or adjusted under 35 U.S.C. 154(b) by 267 days.

(21) Appl. No.: 13/180,002

(22) Filed: Jul. 11, 2011

(65) Prior Publication Data

US 2012/0039375 A1    Feb. 16, 2012

(30) Foreign Application Priority Data

Aug. 10, 2010 (EP) .................................... 10008325

(51) Int. Cl.
    *H04L 27/00*     (2006.01)
(52) U.S. Cl.
    USPC ........... 375/324; 375/316; 375/319; 375/322; 375/340; 375/344
(58) Field of Classification Search
    USPC ......... 375/146, 147, 230, 271, 302, 316, 319, 375/322, 324, 340, 344, 347
    See application file for complete search history.

(56) References Cited

U.S. PATENT DOCUMENTS

| | | | | |
|---|---|---|---|---|
| 6,075,820 | A * | 6/2000 | Comino et al. ................ | 375/245 |
| 6,940,916 | B1 * | 9/2005 | Warner et al. ................. | 375/261 |
| 7,146,146 | B2 | 12/2006 | Masenten et al. | |
| 7,443,783 | B2 * | 10/2008 | DeChamps et al. .......... | 370/208 |
| 7,609,772 | B2 * | 10/2009 | Yu et al. ........................ | 375/260 |
| 7,672,656 | B2 | 3/2010 | Husted | |
| 8,219,055 | B2 * | 7/2012 | Harpak et al. ............. | 455/226.1 |
| 2006/0291590 | A1 * | 12/2006 | Elahi et al. .................... | 375/332 |
| 2007/0097271 | A1 * | 5/2007 | Gao et al. ...................... | 348/724 |
| 2008/0089443 | A1 * | 4/2008 | Sanada et al. ................. | 375/319 |
| 2012/0099673 | A1 * | 4/2012 | Johansson ..................... | 375/296 |
| 2012/0106686 | A1 * | 5/2012 | Zhang et al. .................. | 375/349 |
| 2012/0170629 | A1 * | 7/2012 | Park et al. ..................... | 375/224 |

OTHER PUBLICATIONS

Anttila; Circularity based I/Q imbalance compensation in wideband direct conversion receivers; IEEE, vol. 57, No. 4, Jul. 2008, pp. 2099-2113.*

Xiao Yan, et al., "Internal calibration techniques for quadrature receiver mismatch errors", Signal Processing, vol. 85, Issue 2, Nov. 3, 2004, 2 pages (Abstract only).

* cited by examiner

*Primary Examiner* — Hirdepal Singh
(74) *Attorney, Agent, or Firm* — Oblon, Spivak, McClelland, Maier & Neustadt, L.L.P.

(57) ABSTRACT

A quadrature demodulator receiver unit (100) comprises a first filter unit (360) that may delay an intermediate signal x(t) whose real part is based on a sampled in-phase IF signal ($x_i(t)$) and whose imaginary part is based on a sampled quadrature IF signal ($x_q(t)$). A second filter unit (366) filters a conjugate complex version of the intermediate signal x(t). The filter coefficients of the filter units (360, 366) are determined using a calibration signal, for example on the basis of ratios of complex-valued spectral components of intermediate signals $x_{cal}(t)$ obtained from the calibration signal cal(t). The filtered signal and the delayed signal are recombined to obtain a compensated output signal y(t). The calibration signal may be supplied from an oscillator circuit supplying a signal for processing a receive signal of the receiver unit (100).

18 Claims, 7 Drawing Sheets

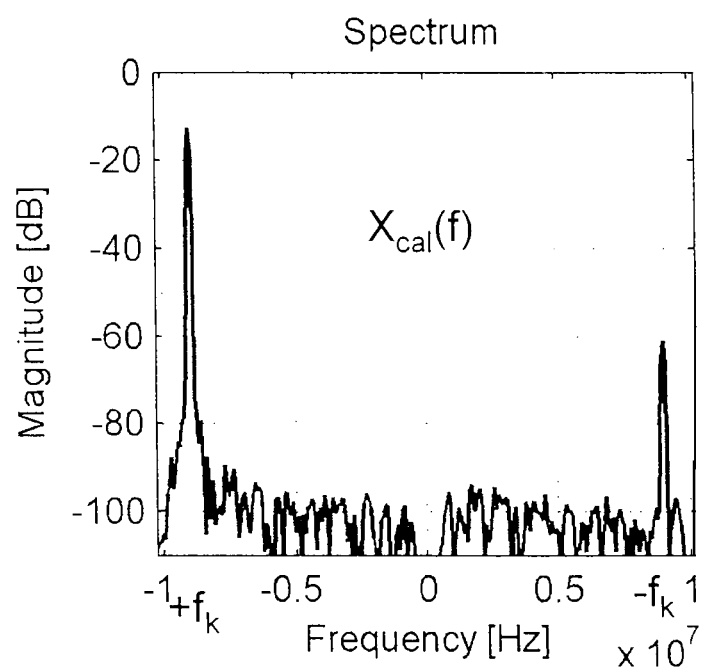

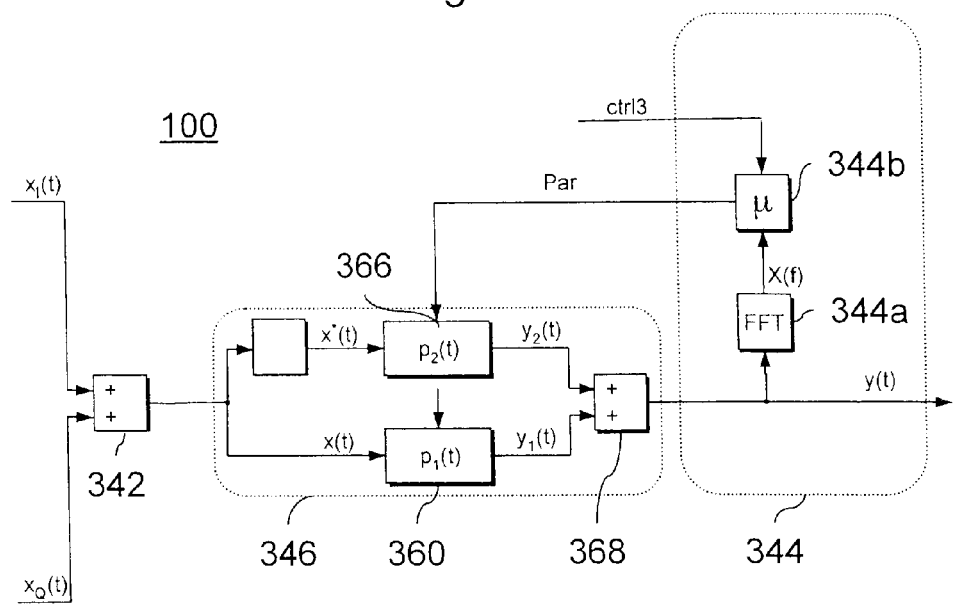
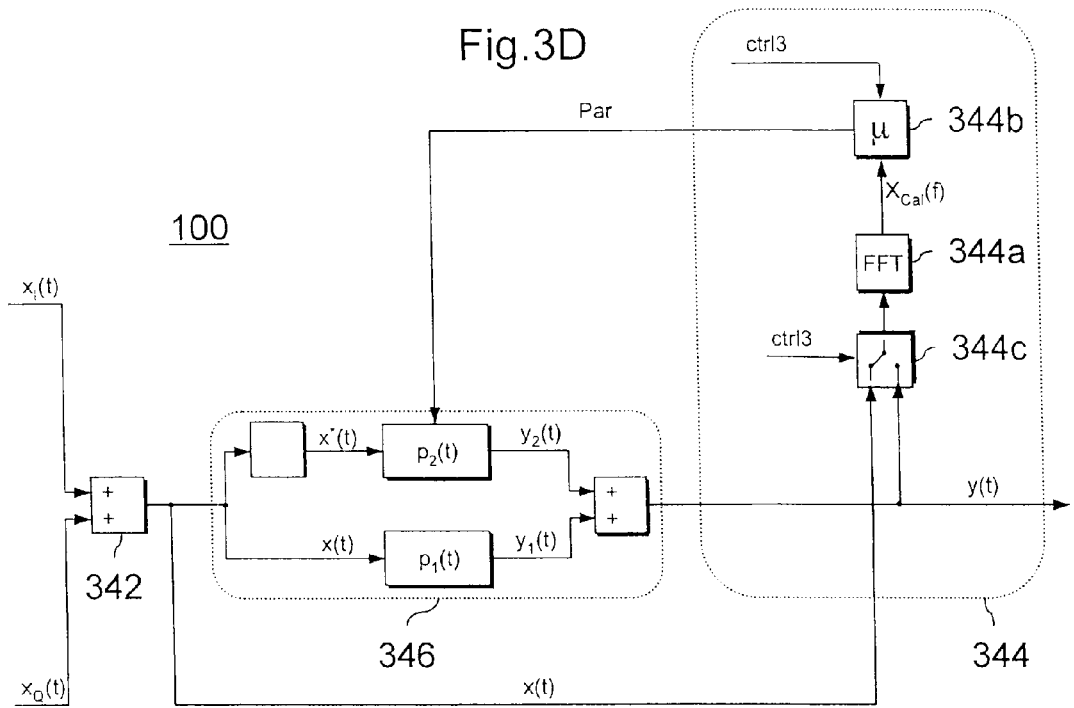

QUADRATURE RECEIVER AND METHOD OF COMPENSATING FOR I/Q IMBALANCE USING A CALIBRATION SIGNAL

An embodiment of the present invention relates to a signal processing method compensating for I/Q imbalance between an in-phase and a quadrature channel in a quadrature demodulator by using a calibration signal. Further embodiments relate to a quadrature receiver unit using a calibration-signal-based I/Q imbalance compensation method.

Quadrature modulation systems modulate a first source signal onto an in-phase component (I) and a second source signal onto a quadrature component (Q) of a carrier signal, wherein the quadrature component is 90 degrees out of phase with the in-phase component. Both components are superposed and sent through a real channel. The reverse process is performed in the receiver. The received signal is down-converted (mixed) to recover the first and second source signals. By way of example, the first and the second source signals may be independent signals or may be derived from a single signal that has been split up into a first and a second source signal on the transmission side and that may be recovered from merging the received first and second source signals on the receiver side.

Receiver architectures that utilize I/Q signal processing are vulnerable to mismatches (imbalance) between the I and the Q paths (channels). For example, a splitter unit configured to distribute the incoming received signal equally between the I and Q paths may introduce phase and gain differences. Different signal delays in the two paths may cause an additional phase imbalance. A phase shifter generating a quadrature phase signal from a local oscillator output may provide a differential phase that is not exactly 90 degrees. The I and Q channel mixers might have different conversion modes which may be frequency dependent. In addition, filters and amplifiers in the I and Q paths are typically not perfectly matched. These I/Q mismatches have detrimental effects on the receiver performance. Some approaches use reference signals for determining an I/Q imbalance.

The present invention provides an improved calibration-signal-based compensation technique.

Details of the invention will become more apparent from the following description of embodiments in connection with the accompanying drawings, wherein features of the various embodiments may be combined unless they exclude each other.

FIG. 3A is a diagram showing a spectrum of an intermediate signal output by the quadrature demodulator of FIG. 1, when a calibration signal with a frequency deviating from a local oscillator frequency $f_{LO}$ by a frequency offset $f_k$ is input to the quadrature demodulator.

FIG. 3C is a schematic block diagram of a correction unit of the receiver unit of FIG. 1 in accordance with an embodiment providing a compensation unit that can be switched transparent for a calibration signal.

FIG. 3D is a schematic block diagram of a correction unit of the receiver unit of FIG. 1 in accordance with an embodiment providing a compensation unit with a calibration signal bypass.

Figure 1:
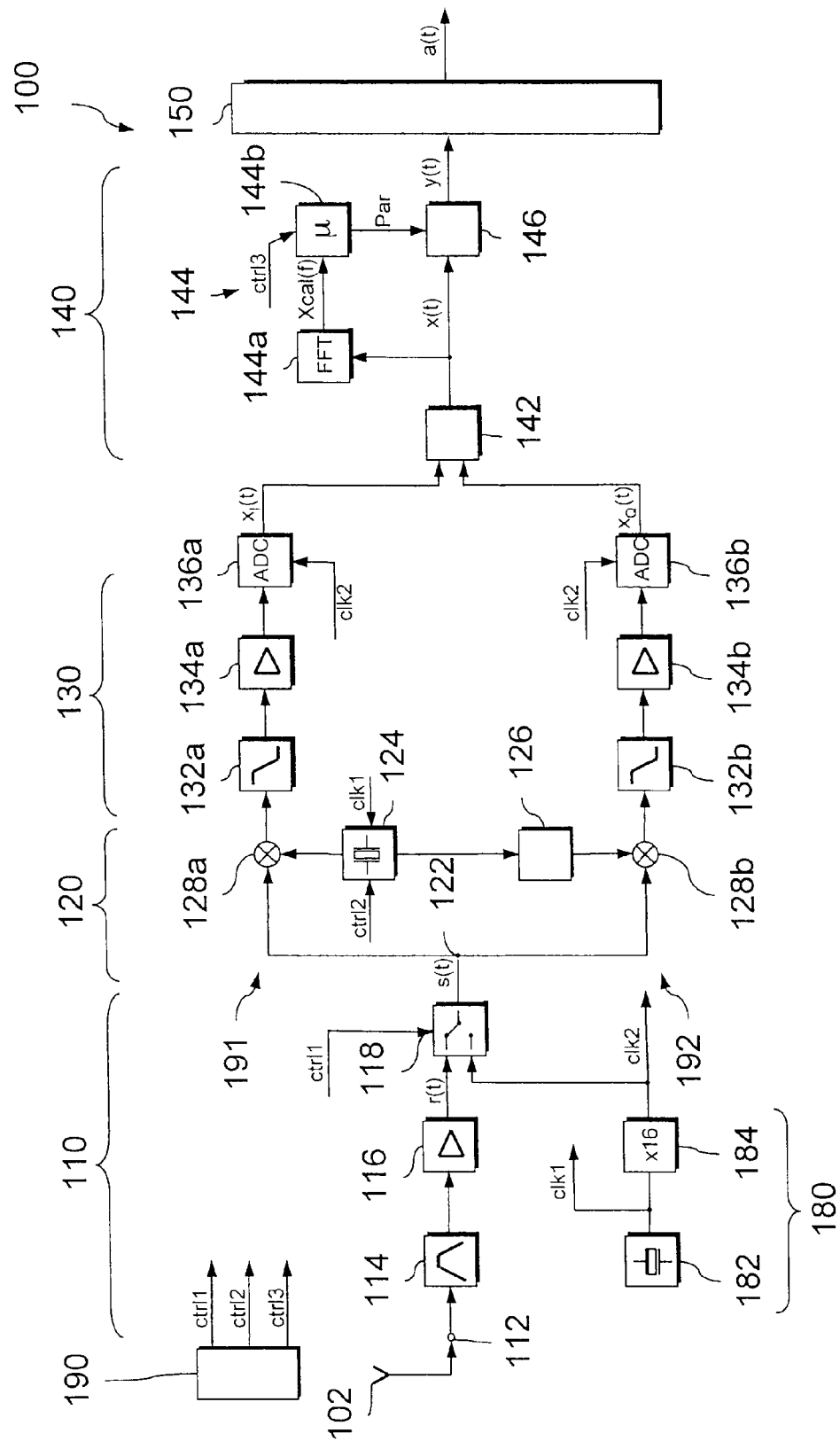
FIG. 1 is a schematic block diagram of a receiver unit including a quadrature demodulator and a correction unit in accordance with an embodiment of the invention.

FIG. 1 illustrates a quadrature demodulator receiver unit 100 including a receiver stage 110, a mixer stage 120, an analogue processing stage 130 and a correction unit 140. Each of the stages 110-130 and the correction unit 140 may be realized as an assembly of discrete devices, as an assembly including both discrete devices and integrated circuits, or as a single integrated circuit. For example, the correction unit 140 may be integrated in a digital signal processor (DSP) that includes or does not include analogue/digital converters (ADCs) and/or a further digital processing unit 150. According to another embodiment at least parts of the analogue stage 130, the correction unit 140 and the digital processing unit 150 are integrated in the same mixed-signal processor.

The receiver unit 100 may be mounted in a mobile or stationary electronic device, for example in a consumer electronic device such as a positioning system, a cellular phone, a radio tuner, a video tuner or a device for wireless near field communications operating, for example, according to the IEEE 802.11a, the IEEE 802.11g or any other WLAN (wireless local area network) standard.

An antenna element 102 may receive radio frequency (RF) signals and may transform them into a conduction-bound receiver signal. The antenna element 102 may be connected to an RF input 112 of the receiver stage 110. In accordance with other embodiments, a splitter element monitoring a communication on a transmission line and branching off a selected receive signal may be connected to the RF input 112. In the receive signal path of the receiver stage 110, a receive filter 114 may narrow the receive signal bandwidth and/or a receiver amplifier 116 may condition the incoming receive signal to obtain a conditioned receiver signal r(t).

The conditioned receiver signal r(t) may contain one modulated carrier signal or an arbitrary collection of modulated carrier signals. The carriers may have any technical relevant frequency in the range from DC up to several GHz, for example in the range from 1 MHz to 1 GHz. In accordance with an embodiment, the carrier frequency is between 600 MHz and 700 MHz.

The receiver stage 110 further includes a switching unit 118 in the receiver signal path. The switching unit 118 may reside at the RF input 112 or directly before the mixer stage 120. A first control signal ctrl1 switches the switching unit 118 from a first state to a second state and vice versa. In the first state, the switching unit 118 directs a signal from an external source, i.e. the conditioned receiver signal r(t), to the mixer stage 120. In a second state, the switching unit 118 isolates the mixer stage 120 from any external RF signal and instead directs a calibration signal cal(t) to the input of the mixer stage 120.

The calibration signal cal(t) may be any periodic signal with a predetermined calibration frequency. In accordance with an embodiment, the calibration signal cal(t) is a sinusoidal signal allowing several simplifications in the I/Q imbalance estimation. The calibration signal cal(t) may be supplied from an external source outside the receiver unit 100 but within the same casing. According to an embodiment, an internal calibration source 180 supplies the calibration signal cal(t). The internal calibration source 180 may be mounted on a printed circuit board or any other carrier or substrate on which at least one of the stages 110 to 130 is arranged and may be dedicated to exclusively supply the calibration signal cal(t).

According to an embodiment, the internal calibration source 180 in addition supplies the calibration signal cal(t) to other circuits of the receiver unit 100 for other applications. In accordance with an embodiment, the calibration signal cal(t) is branched off from an oscillator circuit providing a signal for processing a receive signal of the receiver unit. For example, the oscillator circuit supplies a sample clock for analogue/digital conversion of signals derived from the receive signal, or a clock signal for internally clocking a digital or mixed signal processor realizing at least one of the functions of the correction unit 140 or the digital processing unit 150, or a local oscillator signal. According to an embodiment, the oscillator circuit is arranged on the same circuit board as the receiver unit or is at least partly embedded in an integrated circuit containing some of the circuits realizing the receiving function.

According to an embodiment, the calibration signal cal(t) is directly derived from an output of an oscillator circuit 182, which may include a crystal oscillator. In accordance with other embodiments, a frequency multiplier or divider 184 may transform the output frequency of the oscillator circuit 182 into a calibration frequency $f_{cal}$ suitable for a calibration signal cal(t). A suitable calibration frequency $f_{cal}$ may be close to that of a local oscillator frequency $f_{Lo}$ of the mixer stage 120 (mixer frequency) such that down-converting the calibration signal cal(t) generates a low intermediate frequency (IF). According to an embodiment the calibration frequency $f_{cal}$ deviates from the mixer frequency $f_{Lo}$ by not more than about 2% of the mixer frequency $f_{Lo}$, for example by not more than 10 MHz in the case of a 665 MHz mixer frequency $f_{Lo}$. For example, the oscillator circuit 182 provides an output frequency of about 41 MHz and a sixteen-fold frequency multiplier 184 transforms the output frequency to a calibration frequency $f_{cal}$ of about 656 MHz for a demodulator circuit with a mixer frequency $f_{Lo}$ of 665 MHz.

A mixer input signal s(t), which is either the conditioned receiver signal r(t) or the calibration signal cal(t), is forwarded to the mixer stage 120 that includes a splitter unit 122 distributing the mixer input signal s(t) onto an in-phase channel 191 (I path) and onto a quadrature channel 192 (Q path). The mixer stage 120 may include a controllable local oscillator 124 generating an approximately sinusoidal local oscillator signal $\cos(2\pi f_{Lo} t)$. A second control signal ctrl2 may control the oscillator frequency $f_{Lo}$ within a predetermined range.

According to an embodiment, the internal calibration source 180 controls the local oscillator 124 via a first auxiliary clock signal clk1 such that a frequency offset $f_k$ between the calibration frequency $f_{cal}$ and the current mixer frequency $f_{Lo}$ is well defined. According to another embodiment, the internal calibration source 180 outputs a second auxiliary clock signal clk2 for controlling sampling of the down-converted signals such that a time base of delay elements in the digital stage is closely tied to frequency information of the down-converted calibration signal. In accordance with further embodiments, the internal calibration source 180, the local oscillator 124 and the source providing the sampling clock for analogue-to-digital conversion in the in-phase and quadrature channels 191, 192 operate on the same crystal clock reference allowing for simplifications in the imbalance estimation and in the computation algorithm determining parameters of a compensation unit. In accordance with other embodiments, all clock signals are independent from each other and may be derived from different sources.

The mixer stage 120 further includes a phase shifter unit 126 that shifts the phase of the local oscillator signal by 90 degrees. A first mixer 128a in the in-phase channel 191 down-converts the mixer input signal s(t) to an in-phase signal. The in-phase signal contains a signal having an intermediate frequency (IF) corresponding to the differential frequency of the local oscillator frequency $f_{Lo}$ and the carrier frequency in the mixer input signal s(t). In the quadrature channel 192, a second mixer 128b down-converts the mixer input signal s(t) to a quadrature phase signal, which also includes a signal having the intermediate frequency. The quadrature phase signal is in quadrature to the in-phase signal. Typically, the first and second mixers 128a, 128b have the same nominal characteristics and deviate in their electric characteristics only due to fabrication tolerances.

The in-phase signal and the quadrature phase signal are forwarded to the analogue processing stage 130. In the in-phase channel 191, the analogue processing stage 130 may include a first filter 132a, which may be a band-pass filter or a low-pass filter. In the quadrature channel 192, the analogue processing stage 130 may include a second filter 132b, for example a low-pass filter or a band-pass filter. The first and second filters 132a, 132b block further mixer frequencies generated in the mixer stage 120. A first amplifier 134a may be arranged in the in-phase channel 191 and a second amplifier 134b may be provided in the quadrature channel 192 so as to condition the respective channel signal for a following A/D conversion. The first and second filters 132a, 132b ideally have the same nominal characteristics and deviate in their electric characteristics only due to fabrication tolerances. The same applies to the first and second amplifiers 134a, 134b.

A first ADC 136a samples the filtered and conditioned in-phase signal and a second ADC 136b samples the filtered and conditioned quadrature phase signal in predefined regular sample intervals defined by a common sample rate of the ADCs 136a, 136b. In accordance with yet described embodiments, the internal calibration source 180 may deliver a clock signal from which the sample rate is derived.

From the sampled in-phase and quadrature phase signals $x_I(t)$ and $x_Q(t)$, the correction unit 140 recovers a compensated signal y(t), which is free from interference components induced by mismatches in the in-phase and the quadrature channels 191, 192. For that purpose, the correction unit 140 includes a compensation unit 146, which may be a digital signal processing unit whose parameters are tuned to compensate for mismatch-induced interferences in an intermediate signal x(t) obtained from the sampled in-phase and quadrature phase signals $x_I(t)$ and $x_Q(t)$ in a combination unit 142.

The correction unit 140 further includes an analyzing unit 144 for determining suitable parameters Par for the compensation unit 146. In accordance with an embodiment, the analyzing unit 144 derives the parameters Par from a spectrum $X_{cal}(f)$ of the intermediate signal $x_{cal}(t)$ when the calibration signal cal(t) is supplied to the input of the mixer stage 120. For this purpose the analyzing unit 144 may include a Fourier transformation unit 144a and a calculator unit 144b. The Fourier transformation unit 144a may include a window function for windowing the intermediate signal $x_{cal}(t)$ and Fourier-transforms the windowed intermediate signal x(t). The calculator unit 144b evaluates the spectrum $X_{cal}(f)$ of the windowed intermediate signal $x_{cal}(t)$ obtained from the calibration signal cal(t) at least at predefined frequencies. On the basis of the evaluation of $X_{cal}(f)$, the calculator unit 144b derives the parameters Par and outputs them to the compensation unit 146. The Fourier transformation unit 144a may be dedicated to the use in the correction unit 140.

A third control signal ctrl3 may control the correction unit 140 and may switch the correction unit 140 from a first state to a second state and vice versa. In the first state, the compensation unit 146 uses suitable parameters for conditioning an intermediate signal x(t) obtained when the conditioned receiver signal r(t) is applied to the input of the mixer stage 120 so as to generate a compensated output signal y(t) which is compensated for frequency-dependent I/Q imbalance. In the second state, the analyzing unit 144 analyzes a non-compensated intermediate signal $x_{cal}(t)$ resulting from applying a calibration signal cal(t) so as to determine the suitable parameters Par.

Each single component, some components or all components of the correction unit 140 may be realized by a program or as electronic circuits, for example as electronic circuits integrated in one or more integrated circuits, for example in a DSP or in an application specific integrated circuit (ASIC).

The digital processing unit 150 further processes the compensated signal y(t) to obtain base-band versions a(t) of a video signal, an audio signal and/or a digital data signal, by way of example. For example, the digital processing unit 150 includes a demodulation unit.

A control unit 190 may be connected to the switching unit 118 and may output the first control signal ctrl1 to control the routing of the calibration signal cal(t) in agreement with an internal process-oriented sequential control routine. The control unit 190 may also be connected to the local oscillator 124 and may output the second control signal ctrl2 to control the oscillator frequency $f_{Lo}$ in agreement with the internal process-oriented sequential control routine. Further the control unit 190 may be connected to the correction unit 140 and may output the third control signal ctrl3 to control the correction unit 140. The control unit 190 may locally integrate all three and further functions. In accordance with another embodiment, one, two or all functions are realized in a distributed manner at different locations within an integrated circuit.

The first and the third control signals ctrl1, ctrl3 may be approximately synchronous signals, wherein the mode of the compensation unit 146 is controlled in substance in agreement with the mode of the switching unit 118. For example, in a receive mode of the receiver unit 100, the switching unit 118 may route the conditioned receive signal r(t) to the input of the mixer stage 120 and the third control signal ctrl3 may switch the correction unit 140 into the first state where the compensation unit 146 is activated and compensates for frequency-dependent I/Q imbalance.

In a calibration mode of the receiver unit 100, the switching unit 118 may route the calibration signal cal(t) to the input of the mixer stage 120. At the same time the third control signal ctrl3 may switch the correction unit 140 in a second state where the analyzing unit 144 is active and evaluates the I/Q imbalance on the basis of an intermediate signal $x_{cal}(t)$ resulting from the calibration signal cal(t). The parameters Par, which are obtained in the calibration mode, are then used to configure the compensation unit 146 for the receive mode such that the measured I/Q imbalance is compensated for.

The second control signal ctrl2 may be used during the calibration mode to vary the intermediate frequency $f_{Lo}$ such that the intermediate signal x(t) can be analyzed at different mixer frequencies $f_k$ allowing for basing the estimation of the Parameters Par on a sufficient number of values. For example, the intermediate signal x(t) is analyzed at ten or more different mixer frequencies $f_k$ to obtain the parameters Par with sufficient precision. According to an embodiment at most 20 different mixer frequencies are used to limit circuit complexity. For example, 16 mixer frequencies $f_k$ are used for determining the parameters Par.

Figure 2:
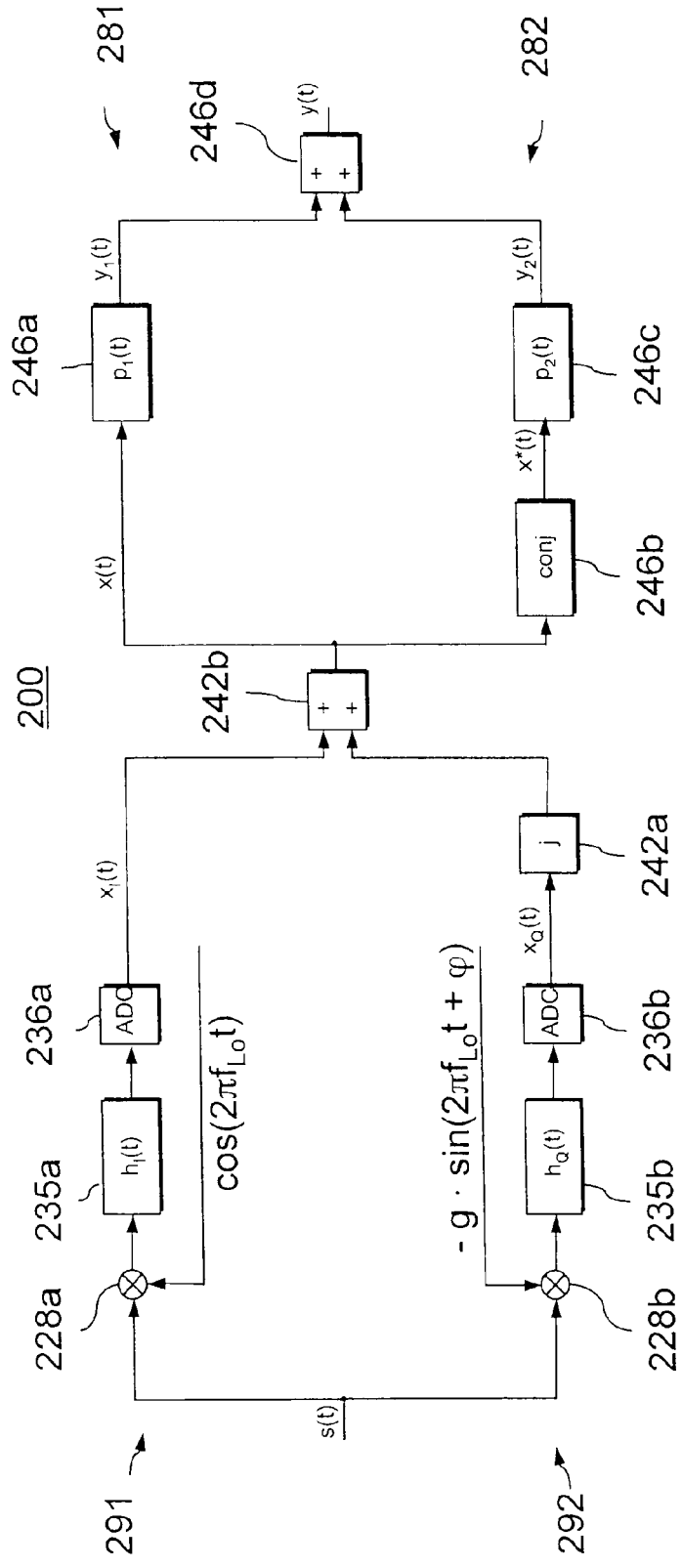
FIG. 2 is a schematic block diagram of a model of the quadrature demodulator of FIG. 1 and a compensation unit in accordance with another embodiment of the invention.

FIG. 2 illustrates an I/Q imbalance model 200 for the mixer and analogue processing stages and the compensator unit. The mixer model includes a first mixer 228a in an in-phase channel (I channel) 291 and a second mixer 228b in a quadrature channel (Q channel) 292. According to this model, the complete I/Q imbalance resulting from the first and second mixers 228a, 228b is assigned to the quadrature channel 292. For that purpose, the output of the local oscillator of the mixer model 220 is modelled with a signal of the form $\cos(2\pi f_{Lo}t)$ and the output of the phase shifter is modelled with a signal of the form $-g\sin(2\pi f_{Lo}t+\phi)$, wherein the gain factor g represents the amplitude imbalance and the phase offset $\phi$ represents the phase imbalance between the in-phase and quadrature phase signals.

The analogue processing stage is modelled with a first signal conditioner 235a with an impulse response $h_i(t)$ in the in-phase channel 291 and a second signal conditioner 235b with an impulse response $h_q(t)$ in the quadrature channel 292, wherein the first and second signal conditioners 235a, 235b may include filters and amplifiers, by way of example. Since fabrication imperfections result in not perfectly identical signal conditioners 235a, 235b, a further component of the I/Q imbalance may result from different impulse responses $h_i(t)$ and $h_q(t)$. The impulse responses $h_i(t)$ and $h_q(t)$ may also contain information about differences between the real ADCs 236a, 236b such that the latter are considered as not contributing to further imbalances in the following.

In a first step, the model 200 is used for estimating the amplitude and phase imbalances for various intermediate frequencies on the basis of an applied calibration signal. In a second step, parameters of a compensation network are derived from the estimated amplitude and phase imbalances.

With the local oscillator frequency (mixer frequency) $f_{Lo}$, the mixer input signal s(t), which can be the calibration signal cal(t) or the conditioned receiver signal r(t), can be modeled as the twofold of the real part of an assumed, balanced target IF signal z(t):

$$s(t)=2Re\{z(t)e^{i2\pi f_{Lo}t}\}=z(t)e^{i2\pi f_{Lo}t}+z^*(t)e^{-i2\pi f_{Lo}t} \quad (1)$$

In equation (1) z*(t) is the conjugate complex version of z(t). Analysis and compensation are performed on the basis of a digital complex-valued intermediate signal x(t) obtained by combining the sampled in-phase and quadrature phase signals $x_I(t)$ and $x_Q(t)$, wherein the in-phase signal $x_I(t)$ represents the real part and the quadrature phase signal $x_Q(t)$ the imaginary part of the complex valued intermediate signal x(t). Formation of x(t) can be modelled with a multiplier unit 242a for forming the imaginary part and a combination unit 242b for combining real and imaginary part:

$$x(t)=x_I(t)+j \cdot x_Q(t) \quad (2)$$

With the model 200 of FIG. 2 and under the assumptions that the frequency-dependent I/Q imbalance of the mixer stage is approximately flat over the considered low IF frequency range and that $h_i(t)$ and $h_q(t)$ in substance feature a low-pass characteristic capable of suppressing signals with a frequency above the desired low IF channel frequencies such that mixing results having a frequency higher than the desired low IF portions are suppressed, the intermediate signal x(t) can be expressed as follows:

$$x(t) = \frac{1}{2}(h_i(t) + ge^{-j\varphi}h_q(t)) * z(t) + \frac{1}{2}(h_i(t) - ge^{j\varphi}h_q(t)) * z^*(t) \quad (2a)$$

In equation (2a), the sign "*" denotes the convolution operator. With the abbreviations as defined in equations (2b) and (2c)

$$m_1(t) = \frac{1}{2}(h_i(t) + ge^{-j\varphi}h_q(t)) \quad (2b)$$

$$m_2(t) = \frac{1}{2}(h_i(t) - ge^{j\varphi}h_q(t)) \quad (2c)$$

the intermediate signal x(t) can be written in the form:

$$x(t) = m_1(t) * z(t) + m_2(t) * z^*(t) \quad (2d)$$

In equation (2d) the intermediate signal x(t) denotes a signal resulting from imbalanced I/Q paths characterized by phase imbalance φ, gain imbalance g and non-identical post-processing filter functions with impulse responses $h_i(t)$ and $h_q(t)$. The spectrum X(f) of the intermediate signal x(t) is given by equation (2e):

$$X(f) = M_1(f) \cdot Z(f) + M_2(f) \cdot Z^*(-f) \quad (2e)$$

The observed intermediate signal x(t) includes a conjugate complex portion that corresponds to a conjugate complex and mirrored portion in the frequency domain. In the frequency domain, the spectrum X(f) of the intermediate signal x(t) contains the spectrum Z(f) of the ideal, balanced signal z(t) and a mirror spectrum Z*(−f) of the balanced signal z(t), each of them modulated by an imbalance function $M_1(f)$, $M_2(f)$ representing the imbalance characteristics. In the time domain, the intermediate signal x(t) contains a first part corresponding to the spectrum Z(f) of the ideal, balanced signal z(t) and a second part corresponding to the mirror spectrum Z*(−f) of the ideal, balanced signal z(t). Equations (2d) and (2e) illustrate that the I/Q imbalance causes mirror-frequency interference which stems from the conjugate signal term present in the intermediate signal x(t).

For analyzing the I/Q imbalance, a calibration signal cal(t) is applied to the model as mixer input signal s(t). According to an embodiment, the calibration signal cal(t) may be a sinusoidal signal which can be denoted as a cosine function having a calibration frequency $f_{cal}$, an amplitude $A_k$ and a phase shift ψ:

$$cal(t) = A_k(t) * \cos(2\pi f_{cal} t + \psi) \quad (3a)$$

Then a mixer frequency $f_{Lo}$ is applied which is offset from the calibration frequency $f_{cal}$ by a frequency offset $f_k$ $$f_{Lo} = f_{cal} - f_k \quad (3b)$$

With equations (3a), (3b) and (1) the balanced low IF signal $z_{cal}(t)$ for s(t)=cal(t) is:

$$z_{cal}(t) = A_k e^{j(2\pi f_k t + \psi_k)} \quad (4)$$

The resulting intermediate signal $x_{cal}(t)$ is captured and evaluated with some unknown time offset $t_0$. With equations (4) and (2d) the intermediate signal $x_{cal}(t)$ is:

$$x_{cal}(t-t_0) = A_k m_1(t-t_0) * e^{j(2\pi f_k t + \psi_k)} + A_k m_2(t-t_0) * e^{-j(2\pi f_k t + \psi_k)} \quad (5)$$

Referring to FIG. 1 the analyzing unit 144 includes a Fourier-transformation unit performing a Fourier-transformation, for example a FFT (Fast Fourier Transformation) of the intermediate signal) $x_{cal}(t)$. With $\theta_k = 2\pi f_k t_0 - \psi_k$, the spectrum $X_{cal}(f)$ of the time-shifted intermediate signal $x_{cal}(t-t_0)$ is:

$$X_{cal}(f) = 2\pi A_0 [M_1(f_k) \cdot e^{-j\theta_k} \delta(f-f_k) + M_2(-f_k) \cdot e^{j\theta_k} \delta(f+f_k)] \quad (6)$$

The terms $2\pi A_0 M_1(f_k) \cdot e^{-j\theta_k}$ and $2\pi A_0 M_2(-f_k) \cdot e^{j\theta_k}$ represent complex-valued amplitudes of two Dirac distributions located at frequencies $f_k$ and $-f_k$, respectively.

FIG. 3A shows the Spectrum $X_{cal}(f)$ of an intermediate signal $x_{cal}(t)$ obtained by supplying a calibration signal cal(t) with a frequency $f_{cal}$ of 656 MHz to the input of a mixer stage having a mixer frequency $f_{Lo}$ of 665 MHz. The down-converted calibration signal appears as a Dirac distribution at the negative offset frequency $+f_k$ (−9 MHz). An image component appears as a Dirac distribution at the positive offset frequency $-f_k$ (+9 MHz).

The image component results from I/Q imbalances. According to an embodiment, the calibration signal cal(t) is down-converted by successively applying different mixing frequencies $f_{Lo}$ and Fourier-transforming the obtained intermediate signals $x_{cal}(t)$ successively. From several spectra $X_{cal}(f)$ of intermediate signals $x_{cal}(t)$, which result from down-converting the calibration signal cal(t) at different frequency offsets information on frequency dependent amplitude and phase imbalance is gathered.

Putting into relation the two Dirac distributions removes the unknown value $\theta_k$ that contains information about the phase-shift between the local oscillator signal and the calibration signal cal(t):

$$D(f_k) = (2\pi A_0 M_2(-f_k) \cdot e^{j\theta_k})^* / (2\pi A_0 M_1(f_k) \cdot e^{-j\theta_k}) \quad (7a)$$

$$D(f_k) = M^*_2(-f_k) / M_1(f_k) \quad (7b)$$

$M_1(f_k)$ and $M_2^*(-f_k)$ can be expressed in terms of the amplitude and phase imbalances and the frequency responses of the real signal conditioners in the I and Q paths as follows:

$$M_1(f_k) = H_i(f_k) + g \cdot e^{-j\phi} \cdot H_q(f_k) \quad (7c)$$

$$M_2(f_k)^* = [H_i(-f_k) - g \cdot e^{j\phi} \cdot H_q(-f_k)]^* \quad (7d)$$

Inserting equations (7c), (7d) in equation (7b) yields equation (7e):

$$D(f_k) = (H_i(-f_k) - g \cdot e^{j\phi} \cdot H_q(-f_k))^* / (H_i(f_k) + g \cdot e^{-j\phi} \cdot H_q(f_k)) \quad (7e)$$

Under the assumption that the impulse responses $h_i(t)$ and $h_Q(t)$ are real-valued, the frequency responses $H_i(f)$ and $H_q(f)$ feature conjugate complex symmetry. Then, with the abbreviation $$H_A(f) = H_q(f)/H_i(f) \quad (8a)$$

equation (7e) can be simplified to $$D(f_k) = (1 - g \cdot e^{-j\phi} \cdot H_A(f_k)) / (1 + g \cdot e^{-j\phi} \cdot H_A(f_k)) \quad (8b)$$

Since both amplitude imbalance and phase imbalance are allowed to be frequency-dependent, $H_A(f_k)$ can be incorporated into a frequency-dependent amplitude imbalance $g_k$ and a frequency-dependent phase imbalance $\phi_k$:

$$D(f_k) = (1 - g_k \cdot e^{-j\phi_k}) / (1 + g_k \cdot e^{-j\phi_k}) \quad (9)$$

Solving equation (9) for the frequency-dependent expression $g_k \cdot e^{-j\phi_k}$ yields:

$$g_k \cdot e^{-j\phi_k} = (1 - D(f_k)) / (1 + D(f_k)) = I(f_k) \quad (10)$$

Equation (10) shows that information on the amplitude and phase of the calibration signal cal(t) is not required for a successful I/Q imbalance estimation. By mixing the calibration signal cal(t) at various mixing frequencies $f_{Lo}$ and measuring, for each mixing frequency $f_{Lo}$, the ratio of the amplitudes of the distributions at $-f_k$ and $+f_k$ in the respective spectrum $X_{cal}(f)$, the frequency dependence of amplitude and phase I/Q imbalance can be evaluated.

The model underlying the described estimation for the frequency-dependent amplitude and phase I/Q imbalance allows performing the estimation on the basis of one calibration signal and a controllable local oscillator for down-converting the calibration signal cal(t) to different intermediate frequencies $f_k$. According to an embodiment the intermediate signal x(t) is windowed before it is Fourier transformed. A full Fourier transformation is not required since the spectra can be evaluated at known frequency points. According to other embodiments referring to receiver units with digital processing units yet including a Fourier transformation unit for other purposes, the imbalance estimation may use yet available resources. The amplitude values of the spectra are directly available from the output of the Fourier transformation unit. The required calculation step is comparatively simple and does not require vast resources.

Turning back to FIG. 1, on the basis of the values for amplitude and phase I/Q imbalance, the analyzing unit 144 further determines parameters Par of the compensation unit 146 that compensates for the frequency dependent amplitude and phase I/Q imbalances.

Turning now again to FIG. 2, the compensation unit includes two parallel channels 281, 282 for the intermediate signal x(t) obtained by combination of the sampled in-phase and quadrature phase signals $x_I(t)$ and $x_Q(t)$. According to an embodiment, a first channel 281 is provided with a first filter unit 246a with a first impulse response $p_1(t)$ and the second channel 282 is provided with a second filter unit 246c with a second impulse response $p_2(t)$ and being effective on the conjugate complex of the complex-valued intermediate signal x(t), wherein the model of the compensation unit further provides a conjugation unit 246b for forming that conjugate complex signal. According to an embodiment, the first filter unit 246a is a delay unit that exclusively delays the input signal. According to other embodiments, the first filter unit 246a may combine two or more delayed versions of the intermediate signal x(t). A recombination unit 246d recombines the filtered signal $y_1(t)$ output by the first filter unit 246a and the filtered signal $y_2(t)$ output by the second filter unit 246c to obtain the compensated signal y(t). Then equation (11a) gives the compensated signal y(t) as a function of the intermediate signal x(t):

$$y(t) = p_1(t)*x(t) + p_2(t)*x*(t) \tag{11a}$$

The spectrum Y(f) of the observed signal y(t) is $$Y(f) = P_1(f)X(f) + P_2(f)X*(-f) \tag{11b}$$

The compensated signal y(t) can be interpreted as an estimation for the ideal balanced signal z(t). To this in equation (11a) x(t) is substituted with its interpretation of the balanced signal z(t) given by equation (2d):

$$y(t) = [p_i(t)*m_1(t) + p_2(t)*m_2*(t)]*z(t) + [p_1(t)*m_2*(t) + p_2(t)*m_1*(t)]*z*(t) \tag{12}$$

The source for the mirror-frequency interference is the term that is convolved with $z*(t)$. For eliminating the complex conjugated portion, it must hold:

$$p_1(t)*m_2(t) + p_2(t)*m_1*(t) = 0 \tag{13}$$

In other words, if the first and second impulse responses $p_1(t)$ and $p_2(t)$ solve equation (13), in equation (12) the conjugate complex portion is removed. According to an embodiment, $p_1(t)$ and $p_2(t)$ represent impulse responses of delay/filter units whose coefficients may be determined as follows.

For determining the unknown filter coefficients for $p_1(t)$ and $p_2(t)$, equation (13) is transformed into the frequency domain and solved for $P_2(f)$:

$$P_1(f)M_2(f) + P_2(f)M_1*(-f) = 0 \tag{14a}$$

$$P_2(f) = -P_1(f)\frac{M_2(f)}{M_1*(-f)} \tag{14b}$$

Inserting equations (7b) and (10) in equation (14b) allows solving $P_2(f)$ at discrete offset frequencies $f_k$:

$$P_2(f_k) = -P_1(f_k)(1 - I*(-f_k))/(1 + I*(-f_k)) \tag{15}$$

Since the analyzing unit is capable of determining $I(f_k)$ using the amplitude values of a plurality of spectra $X_{cal}(f_k)$ at different offset frequencies $f_k$, see equations (7b) and (10) the gathered information can be used to configure a two-path compensation unit.

According to the illustrated embodiment the first filter unit 246a in the first channel 281 is provided as a simple delay element delaying the signal at its input by an integer multitude of the sample interval. This may result in a small signal distortion d(t) wherein y(t)=d(t)*z(t). However, since in real world systems a quadrature demodulator has to cope with stronger channel distortions, a small distortion is in most cases negligible.

With the first filter unit 246a being a simple delay element, equation (15) becomes solvable for $P_2(f_k)$. $P_2(f_k)$ may be solved for all measured offset frequencies f, and further values for other offset frequencies may be interpolated. The obtained spectral response $P_2(f_k)$ of the second filter unit 246c is inverse Fourier-transformed to obtain the second impulse response $p_2(t)$ of the second filter unit 246c in the time domain. The second impulse response gives attenuation values of a delay chain.

Figure 3B:
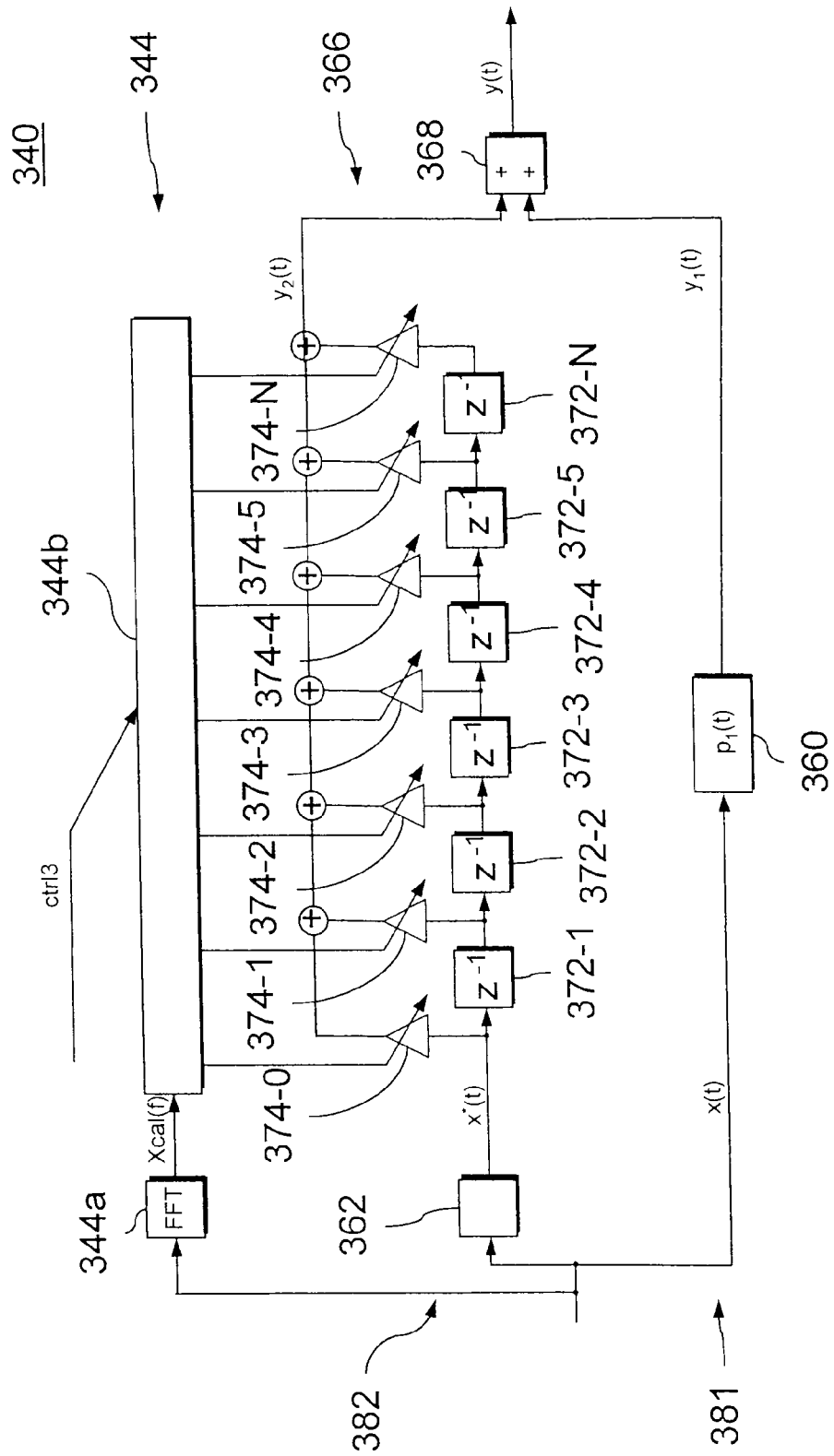
FIG. 3B is a schematic block diagram showing details of the compensation unit of FIG. 2.

FIG. 3B illustrates details of a correction unit 340. A complex-valued intermediate signal x(t) with the sampled in-phase signal $x_I(t)$ representing the real part and the sampled quadrature phase signal and $x_Q(t)$ representing the imaginary part is forwarded to a first channel 381 and to a second channel 382 provided in parallel to the first channel 381. The first channel 381 comprises a first filter unit 360. According to an embodiment, the first filter unit 360 is a delay unit that exclusively delays the intermediate signal x(t) and generates a delayed version $y_1(t)$ of the intermediate signal x(t) on its output. The second channel 382 includes a conjugation unit 362 that provides, from the intermediate signal x(t), the conjugate complex signal x*(t) and a second filter unit 366 with variable filter coefficients determined on the basis of a calibration signal. For example, the filter coefficients are calculated on the basis of ratios of complex-valued spectral components of intermediate signals $x_{cal}(t)$ at positive and corresponding negative offset frequencies obtained in a calibration mode, where a calibration signal cal(t) is down-converted to different offset frequencies $f_k$. For example, the filter coefficients are calculated on the basis of amplitude ratios and phase differences of corresponding spectral components. The second filter unit 366 generates a filtered signal $y_2(t)$ on its output. A recombination unit 368 recombines the filtered signals $y_1(t)$, $y_2(t)$ to generate the compensated signal y(t).

According to an embodiment, the first filter unit 360 is a delay unit that delays the intermediate signal x(t) by a predetermined integer multiple L in terms of a sampling interval, wherein the sampling interval is given by the sample rate of the sampled in-phase and quadrature phase signals.

The second filter unit 366 may comprise a predetermined number N+1 of stages arranged in series, wherein the second and any higher stage may include one delay unit 372-1, 372-2, ..., 372-N and each stage may include one weighting unit 374-0, 374-1, ..., 374-N. Each of the weighting units is described by its filter coefficient. The outputs of the stages are superposed or summed up to generate the filtered signal $y_2(t)$. The second filter unit 366 may have at least 1 and up to 1000 stages, for example between 5 and 20 stages.

The values for N and L are predetermined on the basis of sample rate, type and strength of fading and specification requirements. According to an embodiment referring to frequency flat I/Q imbalance, N may be 1 and L may be set equal zero. In accordance with embodiments referring to frequency selective fading, both N and L may typically set greater zero, for example in the range between 1 and 20. According to other embodiments, L is less than N, for example L is N decreased by one. In accordance with other embodiments, N is in the range between 3 and 10 and L is set to N−1.

The correction unit 340 may further comprise an analyzing unit 344 including a Fourier transformation unit 344a and a calculator unit 344b. The Fourier transformation unit 344a may include a window function and evaluates the spectrum of the windowed intermediate signal x(t). The calculator unit 344b is capable of determining the respective filter coefficients and outputs them to the respective weighting unit 374-0, ..., 374-N.

A third control signal ctrl3 may control the mode of the calculator unit 344b. For example, when changing from the calibration mode into the a receive mode, the third control signal ctrl 3 may control the calculator unit 344b to output the determined filter coefficients to the second filter unit 366. In addition or alternatively, the third control signal ctrl3 may be used to activate and deactivate the Fourier transformation unit 344a and/or the calculator unit 344b.

FIG. 3C refers to an embodiment where the third control signal ctrl3 controls the calculator unit 344b to set the filter coefficients Par in response to a selected mode, which can be the calibration mode or the receiver mode. In the calibration mode, the filter coefficients Par are selected to switch the compensation unit 346 transparent.

For example, in the calibration mode, the calculator unit 344b may block the second filter unit 366. According to an embodiment, the calculator unit 344b may set all filter coefficients to "zero", such that the filtered signal $y_2(t)$ is a "zero" signal and the signal at the output of the recombination unit 368 is the delayed intermediate signal x(t).

In accordance with another embodiment the first filter unit 360 is configurable and may take at least two different configurations. In a first configuration it delays the intermediate signal by the predetermined amount. In a second configuration it transmits the intermediate signal without delay. For example, the first filter unit 360 includes one filter stage delaying the intermediate signal by the predetermined delay, a first weighting unit for the un-delayed intermediate signal and a second weighting unit for the delayed intermediate signal. In the calibration mode, the calculator unit 344b blocks the second weighting unit, for example by setting the corresponding filter coefficient to zero and activates the first weighting unit, for example by setting the corresponding filter coefficient to "one". Vice versa, in the receiver mode, instead of the first weighting unit the second weighting unit may be activated.

FIG. 3D refers to a further embodiment, where the filter coefficients do not depend on the mode. Instead the third control signal ctrl3 controls a switch unit 344c at the output of the compensation unit 346. In the calibration mode, the switch unit 344c connects the input of the compensation unit 346 to the input of the Fourier transformation unit 344a, which may include a window function. In the receive mode, the switch unit 344c may connect the output of the compensation unit 346 to the input of the Fourier transformation unit 344a and instead routes the output of the compensation unit 346 to the Fourier transformation unit 344a. The switch unit 344c may allow supervising the effect of the compensation unit 346, by way of example.

Figure 4A:
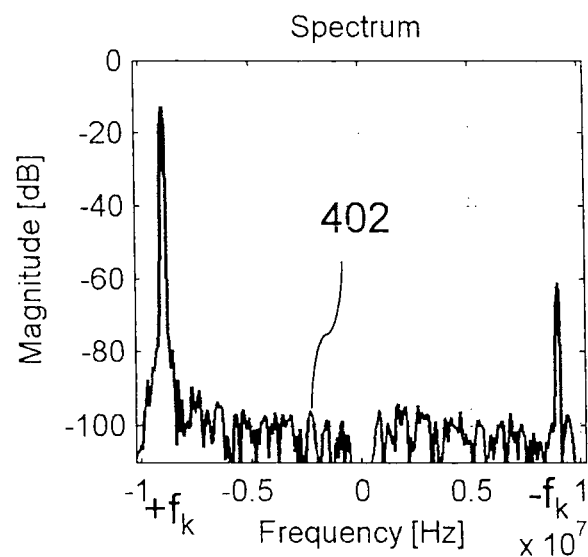
FIG. 4A is a spectrum of an intermediate signal obtained by combining sampled in-phase and quadrature phase signals without using compensation for illustrating effects of embodiments of invention.
Figure 4B:
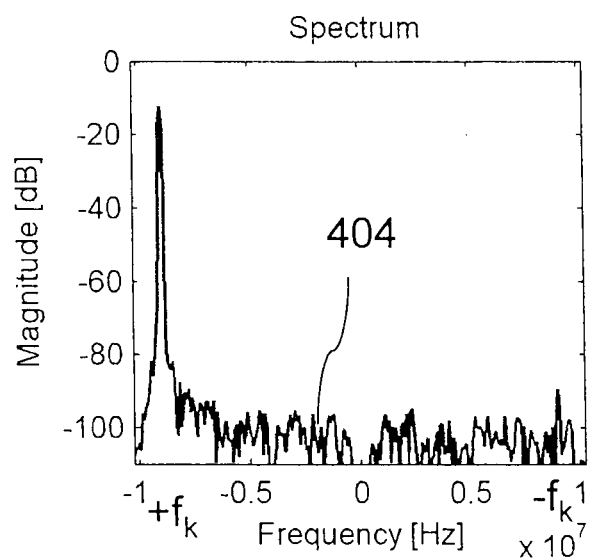
FIG. 4B is a spectrum of a compensated signal obtained by compensating the intermediate signal with the spectrum of FIG. 4A by using a compensation method in accordance with an embodiment of the invention.

FIGS. 4A and 4B illustrate the effect of a compensation method according to an embodiment of the invention. FIG. 4A shows the Spectrum 402 of an intermediate signal x(t) obtained by supplying a calibration signal cal(t) with a frequency $f_{cal}$ of 656 MHz to the input of a mixer stage having a mixer frequency $f_{Lo}$ of 665 MHz. The down-converted calibration signal appears as a Dirac distribution at the offset frequency $+f_k$ (−9 MHz). An image component appears as a Dirac distribution at the offset frequency $-f_k$ (+9 MHz).

From the ratio of both distributions amplitude and phase imbalance for $f_k$ are determined. Determination is repeated for several offset frequencies $f_k$. On the basis of the determined values for amplitude and phase imbalance, filter coefficients for a configurable 13-tap FIR (finite impulse response) filter arranged in parallel with a delay path and being effective on the conjugate complex intermediate signal are calculated and applied to the filter. The calibration signal of FIG. 4A is again applied with the filter activated.

Figure 5:
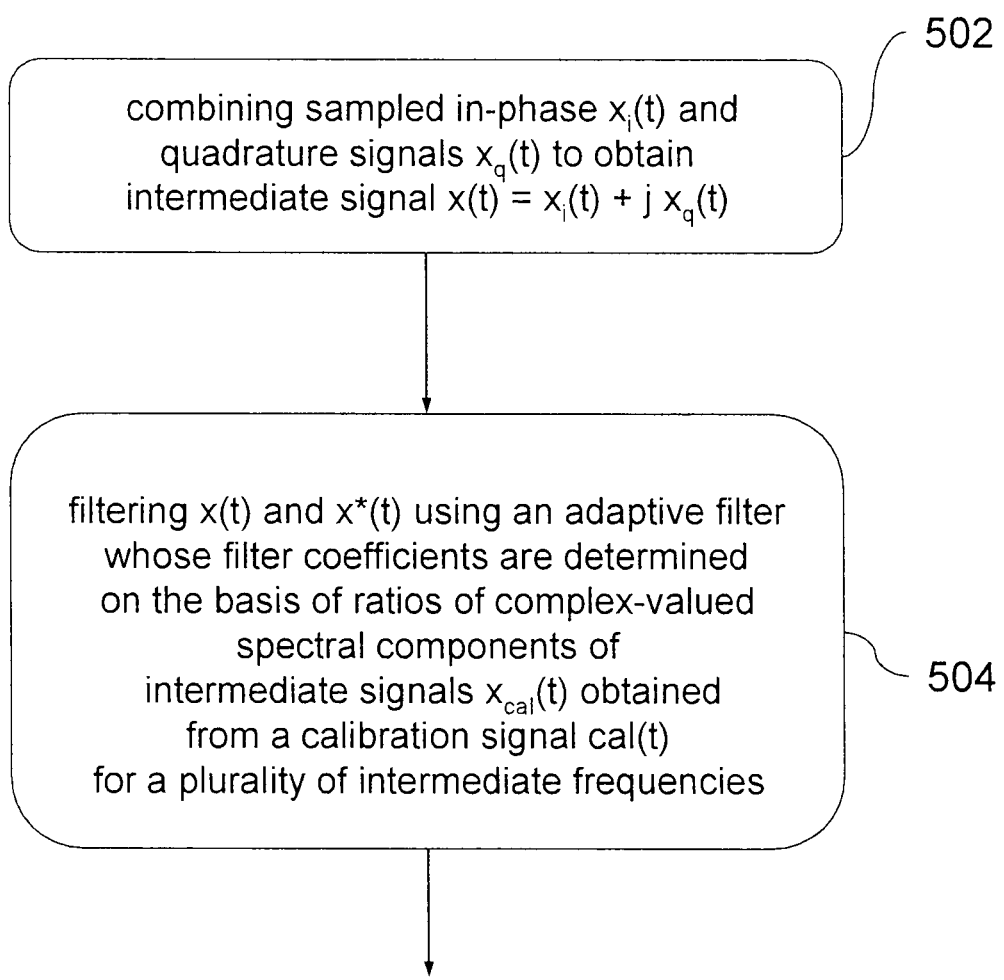
FIG. 5 is a simplified flow chart illustrating a method of compensating imbalance between the I/Q channels in a quadrature demodulator in accordance with another embodiment of the invention.

The resulting spectrum 404 is illustrated in FIG. 4B. The I/Q calibration yields and additional image suppression of about 30 dB resulting in a final IRR (image rejection ratio), which represents the ratio between the spectrum of the image signal and the spectrum of the desired output signal, of approximately 80 dB The flow chart illustrated in FIG. 5 relates to a method compensating for I/Q imbalance in a quadrature demodulator. The compensation method may be applied in the course of a method of processing a quadrature modulated receiver signal, for example as a method of operating a receiver unit including a quadrature receiver or demodulator.

For example, the quadrature modulated receiver signal is demodulated in a quadrature demodulator, wherein an in-phase signal and a quadrature phase signal are generated. The in-phase and quadrature phase signals are sampled, wherein sampled in-phase and quadrature phase signals are obtained. The sampled in-phase and quadrature signals are combined to an intermediate signal x(t) whose real part may be based on the sampled in-phase IF signal $x_i(t)$ and whose imaginary part may be based on the sampled quadrature IF signal $x_q(t)$ (502). The complex conjugated intermediate signal x*(t) is filtered using an adaptive filter whose filter coefficients are determined on the basis of ratios of complex-valued spectral components of such intermediate signals $x_{cal}(t)$ which have been obtained from a calibration signal cal(t) for a plurality of intermediate frequencies, wherein each ratio is formed from a complex-valued spectral component at a positive intermediate frequency and a complex-valued spectral component at a corresponding negative intermediate frequency (504). In other words, each ratio is formed on the basis of amplitude ratios and phase differences of spectral components at the positive and corresponding negative intermediate frequency.

The filtered signal may be recombined with a delayed version of the intermediate signal x(t) to obtain an output signal y(t). The delayed version of the intermediate signal x(t) may be obtained by delaying the intermediate signal by an integer multiple L of a sampling interval corresponding to a sample rate of the sampled in-phase and quadrature phase signals, wherein the integer multiple L is greater than zero.

According to an embodiment, the filter coefficients may be determined from amplitude ratios and phase differences of corresponding spectral components of such intermediate signals $x_{cal}(t)$ which have been obtained from the calibration signal cal(t) at different intermediate frequencies. The intermediate signals $x_{cal}(t)$ obtained from the calibration signal cal(t) may be Fourier-transformed to obtain the spectra $X_{cal}(f)$ of the intermediate signals $x_{cal}(t)$ obtained from the calibration signal cal(t). The method allows for compensating for frequency-dependent I/Q imbalance without requiring vast additional hardware components.

According to a further aspect, the invention refers to a receiver unit with a compensation unit that comprises a first and a second filter unit. The first filter unit filters, for example delays, an intermediate signal x(t) whose real part is based on a sampled in-phase IF signal $x_i(t)$ and whose imaginary part is based on a sampled quadrature IF signal $x_q(t)$. The second filter unit filters a conjugate complex version of the intermediate signal x(t). The filter coefficients of the first and second filter units are derived on the basis of a calibration signal in a way that allow to use an oscillator circuit that also supplies a signal for processing a receive signal of the receiver unit, for example a sample clock an internal processing clock and/or a local oscillator signal as calibration signal source. A recombination unit recombines the output signals of the filter units to generate a compensated signal.

According to an embodiment of this aspect, the first filter unit is configured to delay the intermediate signal x(t) by an integer multiple L in terms of a sampling interval corresponding to a sample rate of the sampled in-phase and quadrature phase signals, wherein the integer multiple L is greater than zero.

According to another embodiment of this aspect, the receiver unit comprises an analyzing unit for determining the filter coefficients on the basis of ratios of complex-valued spectral components of intermediate signals $x_{cal}(t)$ obtained from the calibration signal cal(t) for the plurality of intermediate frequencies, wherein each ratio is formed from a complex-valued spectral component at a positive intermediate frequency and a complex-valued spectral component at the corresponding negative intermediate frequency, for example on the basis of amplitude ratios and phase differences of corresponding spectral components.

The invention claimed is:

1. A receiver comprising:
   a first filter configured to filter an intermediate signal whose real part is based on a sampled in-phase IF signal and whose imaginary part is based on a sampled quadrature IF signal;
   a second filter configured to filter a conjugate complex version of the intermediate signal; and
   an analyzing circuit configured to determine filter coefficients of the second filter on the basis of ratios of complex-valued spectral components of intermediate signals obtained from a calibration signal for a plurality of intermediate frequencies, wherein each ratio is formed from a complex-valued spectral component at a positive intermediate frequency and a complex-valued spectral component at the corresponding negative intermediate frequency.

2. The receiver of claim 1, further comprising:
   an oscillator circuit configured to supply a signal for processing a receive signal of the receiver and the calibration signal.

3. The receiver of claim 1, further comprising:
   a recombination circuit unit configured to recombine output signals of the first and second filters to generate a compensated signal.

4. The receiver of claim 1, wherein
   the analyzing circuit is further configured to determine the filter coefficients of the second filter from spectral amplitudes of the intermediate signals obtained from the calibration signal at different intermediate frequencies.

5. The receiver of claim 1, wherein
   the analyzing circuit is further configured to Fourier-transform the intermediate signals obtained from the calibration signal to obtain spectra of the intermediate signals obtained from the calibration signal.

6. The receiver of claim 1, further comprising:
   an output circuit configured to output a signal obtained by recombination of output signals of the first and second filters in a receive mode.

7. The receiver of claim 1, further comprising:
   a quadrature demodulator configured to generate the sampled in-phase and sampled quadrature phase signal from a mixer input signal; and
   a switching circuit configured to output a receiver signal to the quadrature demodulator in a receive mode and the calibration signal in a calibration mode.

8. The receiver of claim 7, wherein
   the quadrature demodulator comprises a controllable local oscillator configured to supply a mixer signal for down-converting the mixer input signal.

9. The receiver of claim 8, further comprising:
   a control circuit configured to control the switching circuit unit, the controllable local oscillator and/or the first and second filters in agreement with an internal process-oriented sequential control routine.

10. An electronic device comprising
    the receiver of claim 1.

11. A receiver comprising:
    a first filter configured to filter an intermediate signal whose real part is based on a sampled in-phase IF signal and whose imaginary part is based on a sampled quadrature IF signal; and
    a second filter configured to filter a conjugate complex version of the intermediate signal and being defined by filter coefficients determined on the basis of intermediate signals obtained from a calibration signal for a plurality of intermediate frequencies, wherein
    the first filter unit is configured to delay the intermediate signal by an integer multiple L in terms of a sampling interval corresponding to a sample rate of the sampled in-phase and quadrature phase signals, wherein the integer multiple L is greater than zero.

12. A method of compensating for I/Q imbalance in a quadrature demodulator, the method comprising:
    combining sampled in-phase and quadrature signals to obtain an intermediate signal whose real part is based on the sampled in-phase IF signal and whose imaginary part is based on the sampled quadrature IF signal; and
    filtering the complex conjugated intermediate signal utilizing an adaptive filter whose filter coefficients are determined on the basis of ratios of complex-valued spectral components of intermediate signals obtained from a calibration signal for a plurality of intermediate frequencies, wherein each ratio is formed from a complex-valued spectral component at a positive intermediate frequency and a complex-valued spectral component at the corresponding negative intermediate frequency.

13. The method of claim 12, wherein
the calibration signal is provided by an oscillator circuit configured to supply a signal for processing a receive signal of a receiver.

14. The method of claim 12, further comprising:
recombining the filtered signal with a delayed version of the intermediate signal to obtain an output signal.

15. The method of claim 14, wherein
the delayed version of the intermediate signal is obtained by delaying the intermediate signal by an integer multiple L of a sampling interval corresponding to a sample rate of the sampled in-phase and quadrature phase signals, wherein the integer multiple L is greater than zero.

16. The method of claim 12, further comprising
determining the filter components of the adaptive filter from spectral amplitudes of the intermediate signals obtained from the calibration signal at different intermediate frequencies.

17. The method of claim 12, further comprising:
Fourier-transforming the intermediate signals obtained from the calibration signal to obtain spectra of the intermediate signals obtained from the calibration signal.

18. A receiver comprising:
a first filter configured to filter an intermediate signal whose real part is based on a sampled in-phase IF signal and whose imaginary part is based on a sampled quadrature IF signal;
a second filter configured to filter a conjugate complex version of the intermediate signal, wherein filter coefficients of the first and second filters are derived from a calibration signal;
a recombination circuit configured to recombine output signals of the first and second filters to generate a compensated signal; and
an oscillator circuit configured to supply a signal for processing a receive signal of the receiver and the calibration signal, wherein
the first filter is configured to delay the intermediate signal by an integer multiple L in terms of a sampling interval corresponding to a sample rate of the sampled in-phase and quadrature phase signals, wherein the integer multiple L is greater than zero.

\* \* \* \* \*